(12) United States Patent
Kakuta et al.

(10) Patent No.: US 6,181,663 B1
(45) Date of Patent: Jan. 30, 2001

(54) DISK APPARATUS WITH SLIDING TRAY AND LOCK ARM FOR PREVENTING SLIDING TRAY MOVEMENT

(75) Inventors: Tsuyoshi Kakuta, Tsuyazakimachi; Hideru Goto, Fukuoka; Masayuki Shiwa, Kasuga, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/068,039

(22) PCT Filed: Dec. 26, 1996

(86) PCT No.: PCT/JP96/03805

§ 371 Date: Apr. 30, 1998

§ 102(e) Date: Apr. 30, 1998

(87) PCT Pub. No.: WO97/24721

PCT Pub. Date: Jul. 10, 1997

(30) Foreign Application Priority Data

Dec. 28, 1995 (JP) .................................................. 7-342796
Apr. 8, 1996 (JP) .................................................. 8-084986
Apr. 9, 1996 (JP) .................................................. 8-086178

(51) Int. Cl.[7] .................................................. G11B 17/04
(52) U.S. Cl. .................................................. 369/77.1
(58) Field of Search .................................. 369/77.1, 77.2; 360/99.02, 99.06, 105, 106

(56) References Cited

U.S. PATENT DOCUMENTS 3,671,893   6/1972  Edgar et al. ........................ 335/179
5,208,713 * 5/1993  Lindsay et al. ....................... 360/105
5,877,922 * 3/1999  Boutaghou ............................ 360/105
5,883,870 * 3/1999  Akiba et al. ......................... 369/77.1
5,943,309 * 8/1999  Watanabe ............................. 369/77.1

FOREIGN PATENT DOCUMENTS 2 126 003    3/1984  (GB) .
6-68572      3/1994  (JP) .
7-153161  *  6/1995  (JP) .
7-240053  *  9/1995  (JP) .

* cited by examiner

Primary Examiner—William R. Korzuch
(74) Attorney, Agent, or Firm—Ratner & Prestia

(57) ABSTRACT

A disk apparatus comprises a tray for mounting a disk thereon, a lock arm for locking the tray to a main body chassis and releasing this locking, a coil for operating the lock arm by an electromagnetic force, a coil holder for holding the coil and transmitting the electromagnetic force to the lock arm, a magnet for applying a magnetic flux necessary for the operation, a rail for holding the tray to the main body chassis and guiding an accommodation/ejection operation, a push block for pushing out the tray, a push spring for operating the push block, an eject button pushed down when the user wants to eject the tray, a detention switch for detecting the push-down of the eject button, and a controller for applying a voltage to the coil upon receiving the detection information. The entire thickness of the tray lock mechanism is composed no more than 5 mm and is accommodated in the rear internal space of the recess so that a disk apparatus reduced in the thickness in the height direction of the outer case is presented.

20 Claims, 9 Drawing Sheets

DISK APPARATUS WITH SLIDING TRAY AND LOCK ARM FOR PREVENTING SLIDING TRAY MOVEMENT

This Application is a U.S. National Phase Application of PCT International Application PCT/JP96/03805.

TECHNICAL FIELD

The present invention relates to a disk apparatus having a mechanism for ejecting a tray on which a disk is mounted from within the main body by an electric signal.

BACKGROUND ART

Recently, the disk apparatus is in a trend of small and thin design, and the mechanism for ejecting and accommodating a tray for mounting a disk thereon is limited in reduction of its thickness in the mechanism of rack and pinion using a motor.

In the eject mechanism for ejecting the tray, generally, the user pushes the button to eject. The eject operation is effected in two manners. In one operation, by the force of pushing the button by the user, the tray is directly unlocked, and the tray is ejected, which is a mechanical eject type, and in other operation, pushing of the button is electrically detected, and the tray is unlocked electrically by the command from the controller, which is a soft eject type. In the soft eject type, the tray can be ejected by a software command according to the guide displayed on a screen of a personal computer or the like.

A conventional disk apparatus is described below. FIG. 9 is an internal structural diagram of a conventional disk apparatus. In FIG. 9, reference numeral 1 is a main body chassis, 2 is an optical pickup, 3 is a tray, 4 is a rail, 7 is an eject button, 8 is a detection switch, 9 is a controller, 10 is a lock arm, 11 is a lock arm shaft, and 12 is a solenoid.

The lock arm 10, lock arm shaft 11 and solenoid 12 compose a tray lock mechanism. The main body chassis 1 supports this entire disk apparatus.

The tray 3 is for mounting a disk (not shown) on, and also accommodates the optical pickup 2, controller 9, eject button 7, detection switch 8 and others as described below. The tray 3 is also provided with a stopper pin 13.

The rail 4 holds the tray 3 in the main body chassis 1, and confines the tray 3 in its operating direction. The lock arm 10 has a pawl at its end, and locks the tray 3 at its stopper pin 13. The eject button 7 transmits an eject command operation of the tray 3 to the detection switch 8. The controller 9 receives the detection of eject operation from the detection switch 8, and applies a voltage to the solenoid 12. The solenoid 12 receives the voltage from the controller 9, and unlocks the lock arm 10.

The disk eject operation for loading or unloading a disk in thus constituted disk apparatus is described below. First, the tray 3 is in locked state. Herein, when the user pushes the eject button 7 provided in the tray 3, this operation is detected by the detection switch 8, and a command for starting tray eject operation is sent to the controller 9. Receiving the command, the controller 9 immediately applies a voltage to the solenoid 12. When the solenoid 12 is put in action, one end of the lock arm 10 is attracted, and the lock arm 10 is rotated, and the pawl at the other end of the lock arm 10 is dislocated from the stopper pin 13, thereby unlocking the tray 13.

At this time, when the user draws out the tray 3, it is ready to load or unload the disk. When accommodating the disk, the user pushes in the tray 3, then the pawl of the lock arm 10 is hooked on the stopper pin 13 of the tray so as to be in a state for accommodation.

However, in the soft eject mechanism using the solenoid as a in this disk apparatus, the greatest barrier for reducing the thickness was the thickness of the solenoid. The solenoid is formed by winding a coil around a moving iron core, and further surrounding the periphery with a metal plate, and basically the section is nearly a square structurally, and it is very hard to reduce the thickness. Moreover, as often seen in recent thin type disk apparatuses, the space for the solenoid must be provided by cutting off part of the main body chassis by saving the space of the printed circuit board for controlling the entire disk apparatus, which is contrary to the demand for small and thin design of disk apparatus.

At the time of locking, a static frictional force by the thrusting force when ejecting the tray is applied to the tray and the lock arm for locking the tray. Therefore, to unlock the tray, in order to overcome this static frictional force, it is preferred to use an actuator which is capable of obtaining a large force when starting to move the lock arm. However, since the conventional solenoid is designed to attract the iron core to the yoke plate by the magnetic force by magnetizing the yoke plate by the coil, the characteristic of the attracting force of the solenoid is not uniform in the moving stroke of the iron core, and force is not produced unless the iron core comes closer to the yoke plate. That is, in the initial state where the iron core is remote, the force is weak, and the force is gradually intensified as the iron core is attracted closer. Such starting characteristic of the solenoid is reverse to the required characteristic when unlocking, and hence the solenoid is not suited to the actuator used in unlocking. Moreover, if the iron core is too remote, the magnetic force of the yoke plate does not reach, and the stroke of the actuator was very short for use in unlocking.

It is hence an object of the invention to present a disk apparatus capable of reducing the thickness of the lock mechanism and electric unlocking mechanism of the tray and others for mounting a disk on, and also reducing the size of the entire apparatus.

DISCLOSURE OF THE INVENTION

A disk apparatus of the invention comprises a tray 102 for mounting a disk thereon, a lock arm 117 for locking the tray 102 to a main body chassis 100 and releasing this locking, a coil 111 for operating the lock arm 117 by an electromagnetic force, a coil holder 112 for holding the coil 111 and transmitting the electromagnetic force to the lock arm 117, a magnet 116 for applying a magnetic flux necessary for the operation, a rail 103 for holding the tray 102 to the main body chassis 100 and guiding an accommodation/ejection operation, a push block 104 for pushing out the tray 102, a push spring 105 for operating the push block 104, an eject button 106 pushed down when the user wants to eject the tray 102, a detection switch 107 for detecting the push-down of the eject button 106, and a controller 108 for applying a voltage to the coil 111 upon receiving the detection information.

According to the invention, by the electromagnetic force of the coil 111, the coil 111 is rotated together with the coil holder 112, and the locking is released as the coil holder 112 pushes the lock arm 117. Since the force generated by the coil 111 is constant with respect to the angle of rotation, by freely designing the cam shape of the cam for pushing the lock arm 117, the force for pushing the lock arm 117 can be varied freely depending on the stroke, so that a large force may be generated when a load is needed for initially moving the lock arm 117. In this constitution, moreover, by using the main body chassis 100 is a yoke of a magnetic element, the thickness as the actuator is only the sum of the magnet 116 and coil 111, so that a very thin actuator can be composed.

Still more, by forming a recess 132 at one side of an outer case 130, this recess 132 may be used as a mounting flange to the computer, and the entire thickness of the tray lock mechanism is defined 5 mm or less, and it may be accommodated in the rear internal space of the recess 132, the entire push mechanism is put inside the rail 103, and the forced eject mechanical parts are arranged in the internal space of the recess 132, so that a disk apparatus reduced in the thickness in the height direction of the outer case can be presented.

As a result, the entire thickness of the disk apparatus can be defined at 12.7 mm (½ inch) or less.

BEST MODE FOR CARRYING OUT THE INVENTION

Figure 1:
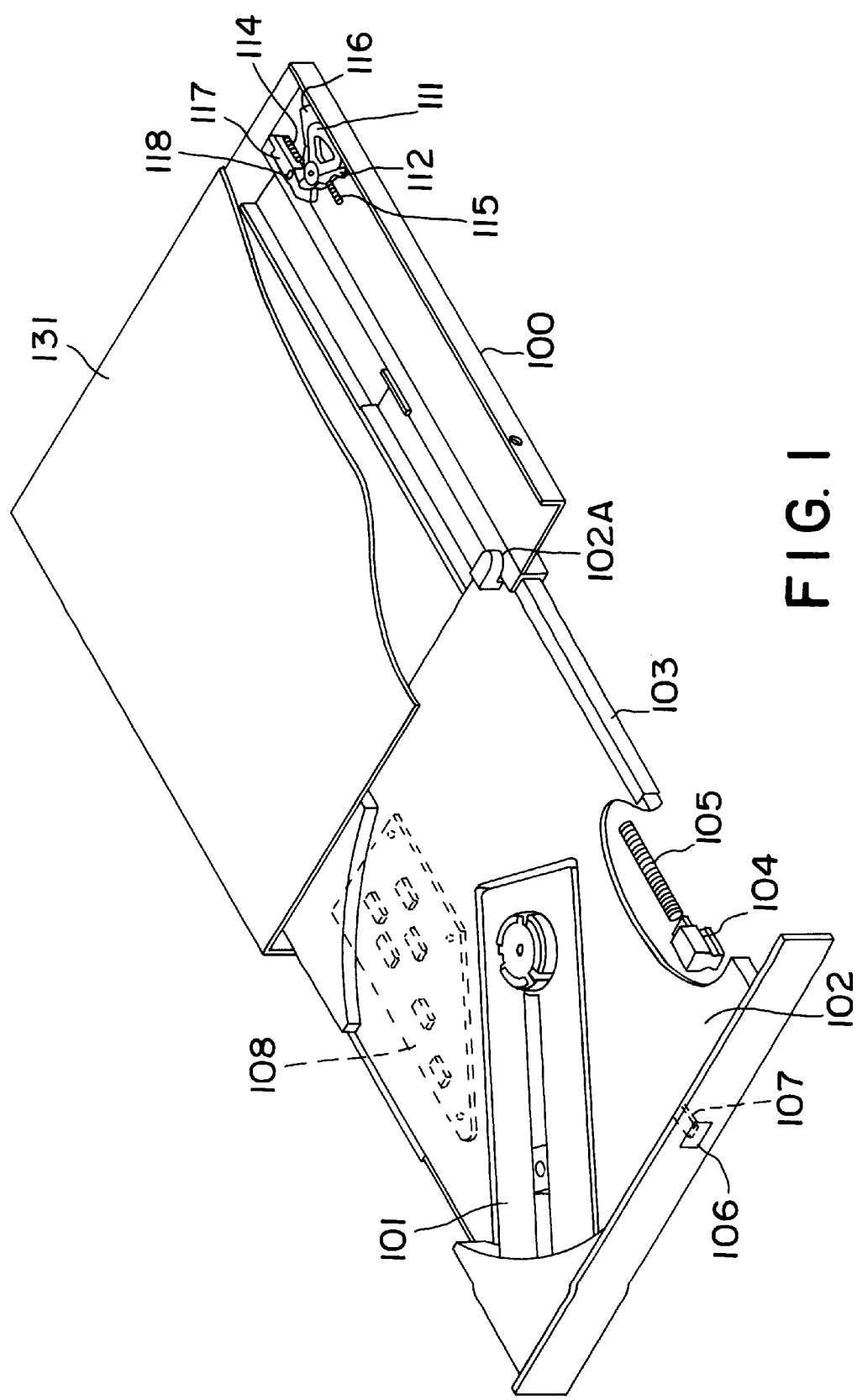
FIG. 1 is a perspective view of an internal structure of a disk reproducing apparatus in an embodiment of the invention.
Figure 2A:
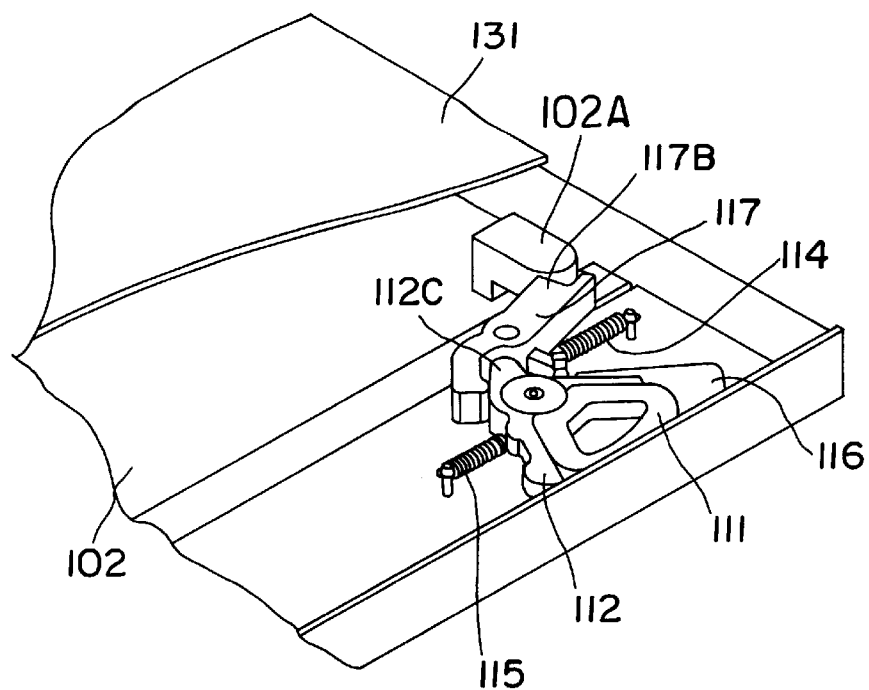
FIG. 2 is an operation explanatory diagram of tray lock mechanism in FIG. 1.
Figure 2B:
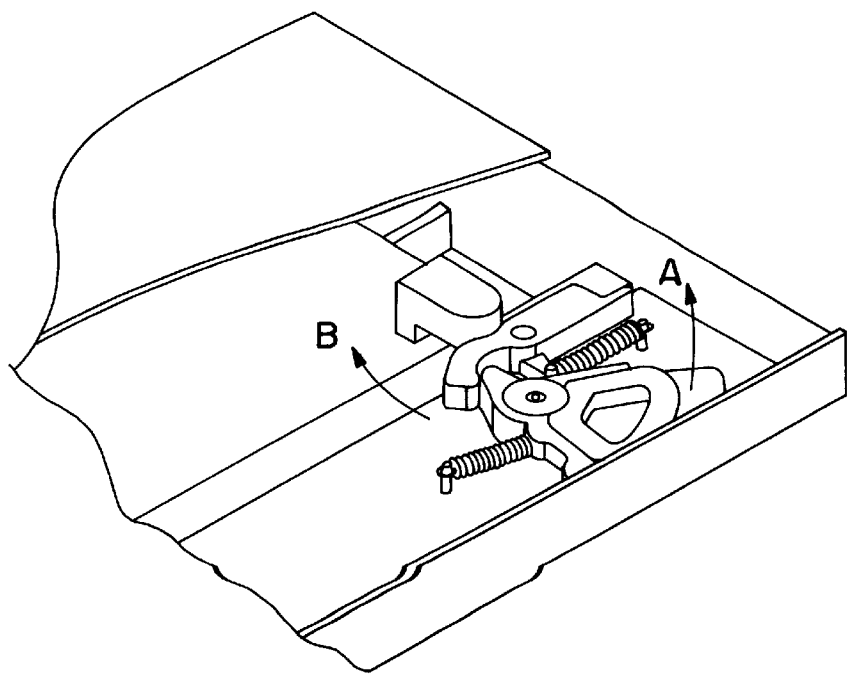
Figure 3A:
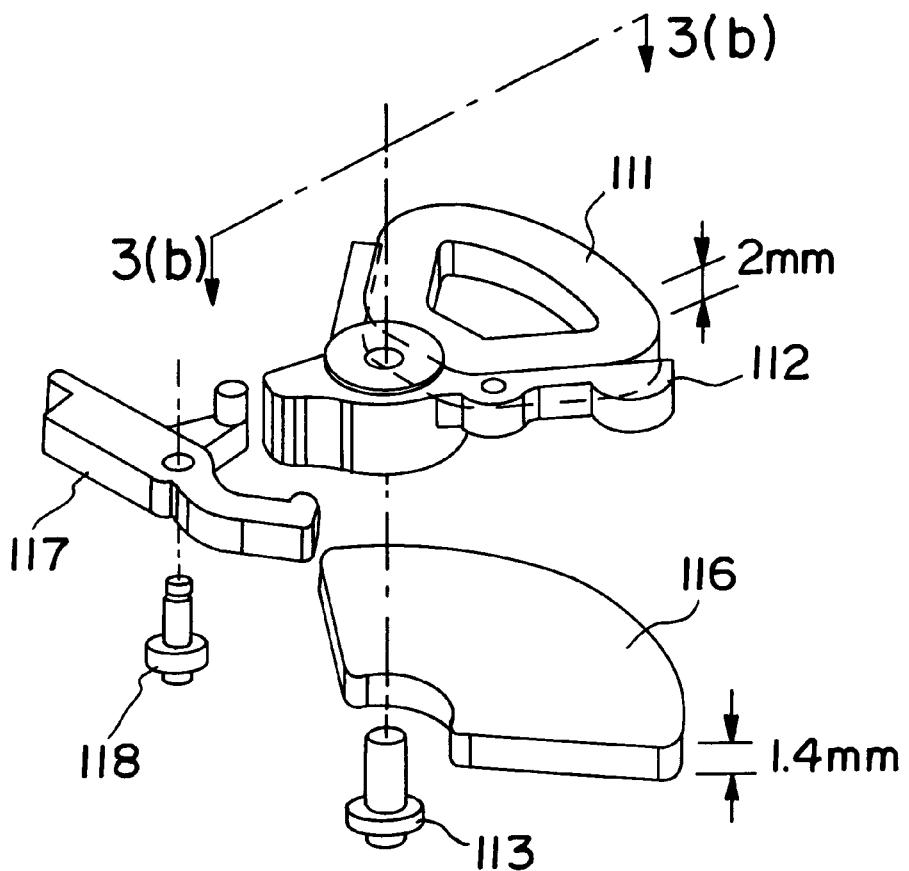
FIGS. 3(*a*) and 3(*b*) are assembly drawings of the tray lock mechanism in FIG. 1.
Figure 3B:
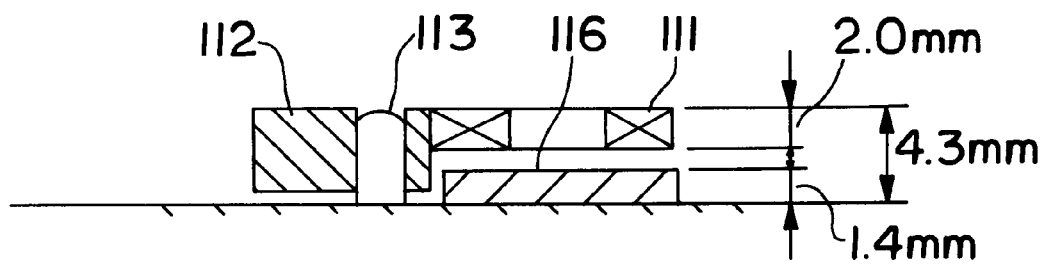

Referring now to the drawings, an embodiment of the invention is described in detail below. FIG. 1 is a perspective view of an internal structure of a disk apparatus in an embodiment of the invention. FIG. 2 is an operation explanatory diagram of tray lock mechanism in FIG. 1, and FIGS. 3(*a*) and (*b*) are assembly drawings of the tray lock mechanism in FIG. 1. FIG. 3(*b*) is a sectional view of the portion along line 3(*b*)–3(*b*) in FIG. 3(*a*). In FIG. 1 to FIG. 3, reference numeral 100 is a main body chassis, 101 is an optical pickup, 102 is a tray, 103 is a rail, 104 is a push block, 105 is a push spring, 106 is an eject button, 107 is a detection switch, 108 is a controller, 111 is a coil, 112 is a coil holder, 113 is a coil support shaft, 114 is a lock arm spring, 115 is a coil spring, 116 is a magnet, 117 is a lock arm, and 118 is a lock arm shaft.

The main body chassis 100 supports the entire disk apparatus. The tray 102 is for mounting a disk (not shown) on, and accommodates the optical pickup 101, controller 108, eject button 106, detection switch 107, and others as described later. At the inner end of the tray 102, a stopper pin 102A for engaging with the lock arm 117 mentioned below is provided. The push block 104 is a member for ejecting the tray 102 form the main body chassis 100. The push spring 105 drives the push block 104 in the tray ejecting direction (FIG. 4; X) by its elastic restoring force.

The optical pickup 101 writes data into the disk (not shown), or reads data from the disk. The rail 103 holds the tray 102 on the main body chassis 100, and also confines the tray 102 in its moving direction (FIG. 4; Y). The lock arm 117 has a pawl 117B at its end, and locks the tray 102 at its stopper pin 102A.

The eject button 106 transmits the eject command operation of the tray 102 to the detection switch 107. The controller 108 receives the detection of the eject operation from the detection switch 107, and applies a voltage to the coil 111.

The coil 111 is adhered to the coil holder 112, and the coil holder 112 is rotatably supported on the coil support shaft 113. The coil 111 receives the voltage from the controller 108, and operates as actuator together with the coil holder 112, and unlocks the lock arm 117.

The lock arm spring 114 and coil spring 115 keep the lock arm 117 and coil holder 112 respectively in the locked state of the tray 102 by their elastic restoring force.

The coil 111, coil holder 112, and coil spring 115 compose the actuator, and the coil support shaft 113, lock arm spring 114, lock arm 117, lock arm shaft 118, and actuator compose the tray lock mechanism.

The magnet 116 produces a magnetic field necessary for operation of the actuator between upper and lower metal plates of the main body chassis 100. In particular, in this embodiment (see FIG. 3(*b*)), the thickness of the magnet 116 is set between 0.5 mm to 3.0 mm. As the magnet material, a ferromagnetic element is used, and more specifically ferritic magnet, rare earth cobalt magnet mainly composed of cobalt alloy, and rare earth ferriferous magnet mainly composed of neodymium, iron and boron may be used. In this embodiment, in consideration of ferromagnetic force for generating a necessary driving force, and ease of processing and magnetizing, a rare earth ferriferous magnet was formed and sintered, and set in a thickness of 1.4 mm. Moreover, the coil 111 and magnet 116 were formed in a sector shape, and they are disposed so that the magnet 116 may confront rationally to the angle of rotation of the coil 111.

Thus, by the electromagnetic force of the coil 111, the coil 111 is rotated together with the coil holder 112, and the coil holder 112 pushes the lock arm 117, thereby unlocking. Since the force generated by the coil 111 is constant with respect to the angle of rotation, by freely designing the cam shape of the cam for pushing the lock arm 117, the force for pushing the lock arm 117 can be varied freely depending on the stroke, so that a large force may be generated when a load is needed for initially moving the lock arm 117.

In this constitution, moreover, by using the main body chassis 100 is a yoke of a magnetic element, the thickness as the actuator is only the sum of the magnet 116 and coil 111, so that a very thin actuator can be composed.

The coil 111 is set in the coil winding diameter and coil finishing thickness in a range of 1.0 mm to 4.0 mm in relation to the required ampere-turn number, and in the embodiment, the finishing thickness is set at 2.0 mm. As a result, the entire thickness of the tray lock mechanism comprising the magnet 116 and actuator is 4.3 mm (less than ¼ inch). In particular, when the entire thickness of the tray lock mechanism is 5 mm or less as in this embodiment, the entire thickness of the disk apparatus can be defined at 12.7 mm or less, and still more the tray lock mechanism can be accommodated in the rear internal space of the recess 132 mentioned below. Accordingly, the space in the peripheral parts and corner parts not used for the disk can be utilized effectively.

Incidentally, since the magnetic field of the magnet 116 is strong, if the magnetic flux cannot be absorbed sufficiently in the magnetic circuit using the main body chassis 100 as the yoke, a ferromagnetic element may be adhered to the back side of the main body chassis 100 corresponding to the position of the magnet 116.

The tray eject operation when loading and unloading the disk in this disk apparatus is described below. First, the unlocking operation of the tray lock mechanism is described while referring to FIG. 2. The state shown in FIG. 2(*a*) is a locked state of the tray 102. At this time, in the lock arm 117 and actuator, a force is applied in the tray locking direction by means of the lock arm spring 114 and coil spring 115.

When the user pushes the eject button 106 provided in the tray 102, the detection switch 107 detects the eject command operation, and sends a signal to the controller 108. Consequently, receiving the signal, the controller 108 applies a voltage to the coil 111 in consideration of other conditions. The coil 111 receives the voltage (detail of wiring route is omitted in the drawing), and the current flowing in its winding receives an electromagnetic force in the magnetic field created by the magnet 116. As a result, the electromagnetic force received in the actuator becomes a rotating torque around the coil support shaft 113.

FIG. 2(*b*) shows an unlocked state of the tray 102. As shown in FIG. 2(*b*), the actuator rotates in direction A about the coil support shaft 113. At the same time, the cam 112C of the coil holder 112 pushes the lock arm 117 in direction B (unlocking direction), and the pawl 117B at the end of the pushed lock arm 117 is dislocated from the stopper pin 102A, thereby unlocking the tray 102.

After unlocking, voltage supply from the controller 108 is stopped, and the actuator returns to the original locking position by the elastic restoring force of the coil spring 115. The lock arm 109 similarly returns to the locking position by the elastic restoring force of the lock arm spring 114. Thus, the tray lock mechanism returns to the initial state (locking position), thereby waiting for mounting of next tray.

Figure 4:
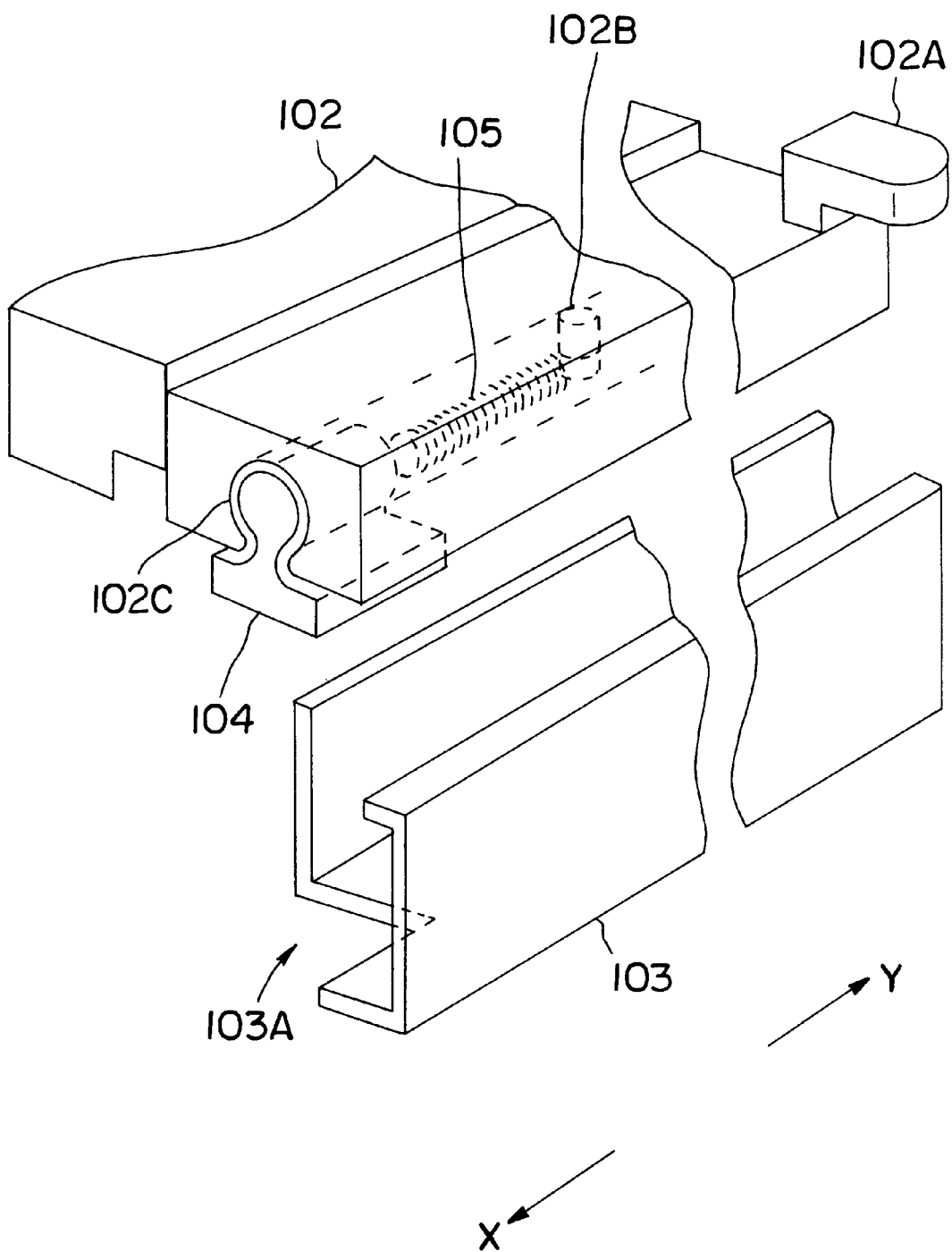
FIG. 4 is a partially magnified view of push mechanism in FIG. 1.

Ejection and accommodation of tray are described below. FIG. 4 is a partial magnified view of push mechanism in FIG. 1. As shown in FIG. 4, in the engaging portion with the rail 103 at the front side (operation side) of the tray 102, the push block 104 and push spring 105 which is a tensile spring are provided. They are collectively called the push mechanism.

The push block 104 freely slides a groove 102C formed in the engaging portion with the rail 103 at the front side (operation side) of the tray 102. In the inner portion of the push block 105, the push spring 105 is fixed. The other end of the push spring 105 is fixed to a boss 102B planted in the inner portion of the groove 102C. At the front end of the rail 103, a notch 103A to be engaged with the push block 104 is provided.

In the ejected state of the tray 102, the push mechanism is accommodated in the groove 102C in the state attracted to the boss 102B. When the tray 102 is pushed in by a specified extent, the push block 104 is engaged with the notch 103A, and when pushed in further, the push spring 105 is expanded. Further, the push spring 105 continues to be expanded until the stopper pin 102A of the tray 102 is engaged with the lock arm 117. In this manner, the entire push mechanism is accommodated inside the rail 103.

Figure 5:
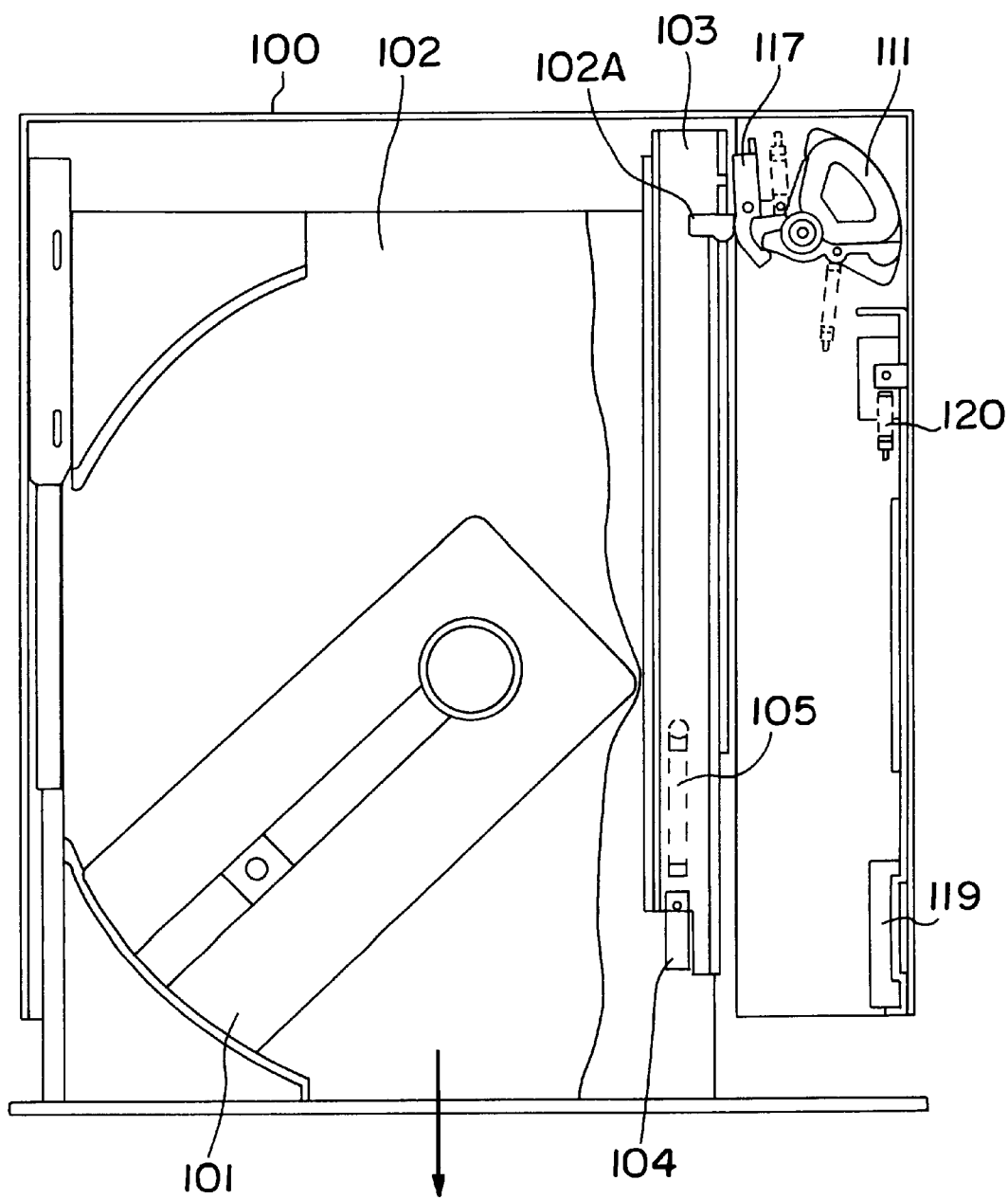
FIG. 5 is a general plan view of unlocked state in FIG. 2.

In thus constituted push mechanism and the tray 102 and rail 103, the tray ejecting and accommodating operation is described. In FIG. 5, as explained in FIG. 2(*b*), the end pawl 117B of the lock arm 117 is dislocated from the stopper pin 102A. At this time, by the restoring force of the push spring 105, the push block 104 is fixed in the rail 103, and the boss 102B is drawn out, and the tray 102 is ejected by a specified extent.

Figure 6:
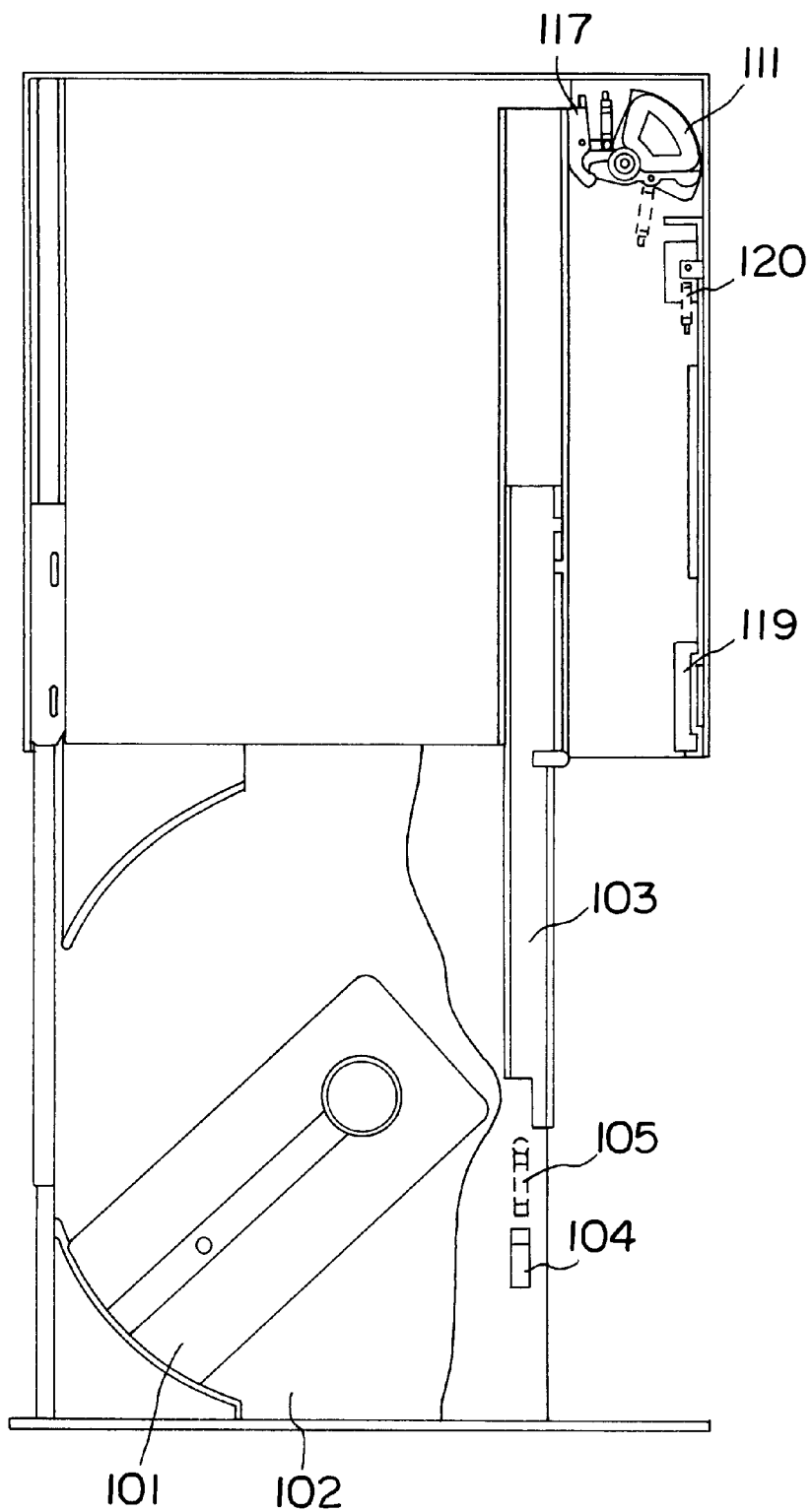
FIG. 6 is a general plan view of fully withdrawn state of tray.

FIG. 6 is a general plan view of the state of drawing out the tray 102 completely. After the tray eject operation, the operator must draw out the tray from the state shown in FIG. 5 to a position capable of loading and unloading the disk as shown in FIG. 6.

After completion of loading or unloading of the disk, when accommodating the tray 102, to the contrary, the operator pushes in the tray, so that the pawl 117B of the lock arm 117 is hooked on the stopper pin 102A of the tray 102 so as to be in a state of accommodation. At this time, the push spring 105 is pulled and deformed by pushing of the tray 102, and thereby accumulates the elastic force for next tray ejection.

Figure 7:
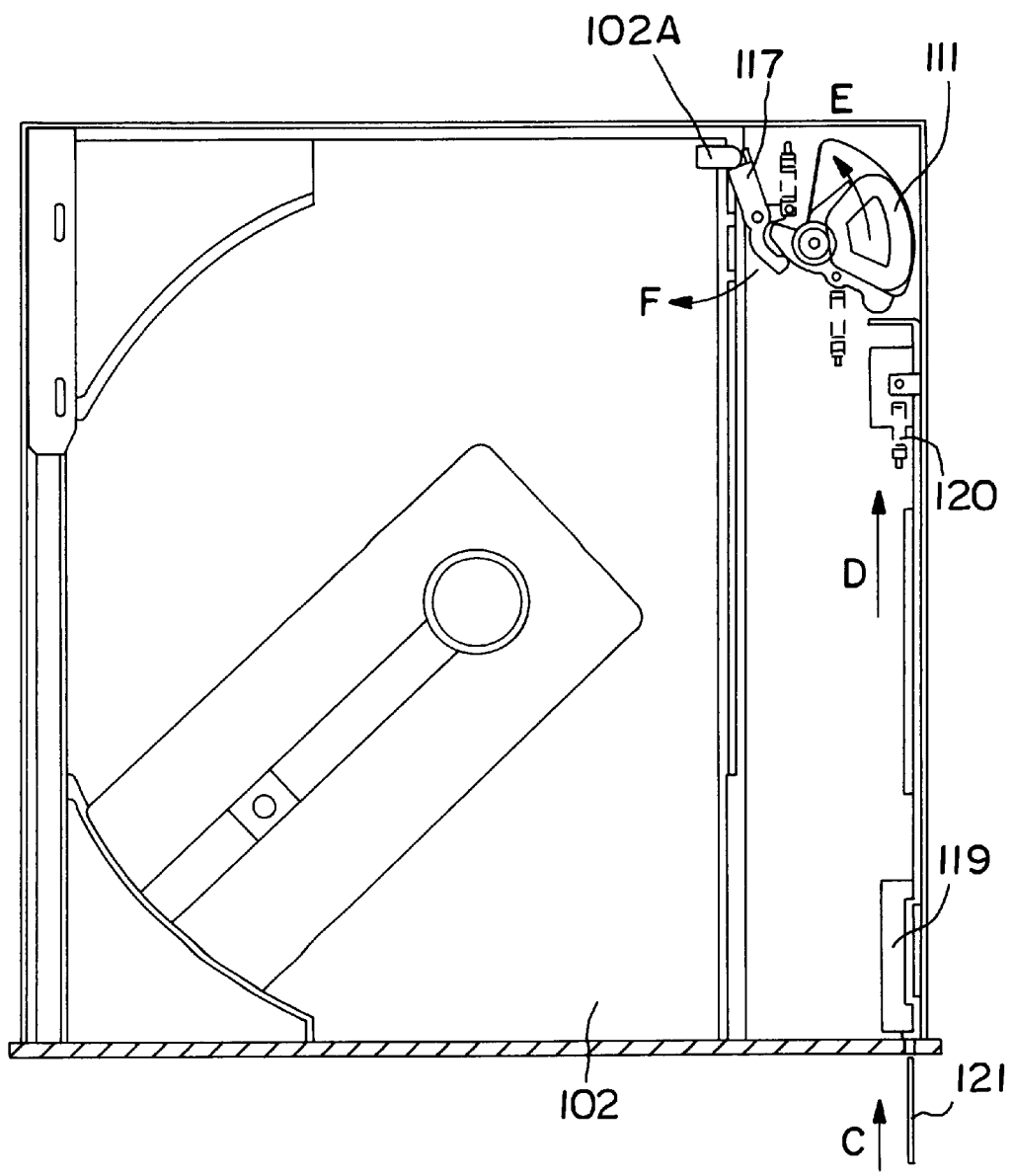
FIG. 7 is a general plan view for explaining forced eject mechanism.

In this course, if the coil 111 fails to function normally due to some trouble, a forced eject mechanism operates as described below. FIG. 7 is a general plan view explaining the forced eject mechanism. Reference numeral 119 is a forced unlocking member, and if the coil 111 fails to function normally due to some trouble, it actuates the coil 111 by force by manual operation, and 120 is a forced unlocking spring, and while the forced unlocking member 119 is not necessary, it sets aside the forced unlocking member 119 so as not to have effects on the action of the coil 111.

First, a pin 121 having a fine end is inserted into a hole provided in the front part of the tray 102 (arrow C). As a result, the inserted pin 121 moves the forced unlocking member 119 to behind the tray 102 (arrow D). The rear end of the forced unlocking member 119 provides the coil holder 112 with a rotary motion, and the coil holder 112 rotates about the coil support shaft 113 (arrow E). Thereafter, same as in the soft eject operation, the lock arm 117 rotates (arrow F). The stopper pin 102A is cleared of confinement to the lock arm 117, and the tray 102 is ejected.

In this embodiment, a tensile spring is used as the push spring 105, but it may be also realized by other means, for example, by forming spring stopping means (for example, raised hook) each in the tray 102 and rail 103, and applying a compressive spring between the tray 102 and rail 103. In this case, the groove 102C and push block 104 can be omitted.

In the foregoing embodiment, the push mechanism is disposed in the operation side front portion, and the tray lock mechanism at the inner side, but by omitting the groove 102C and push block 104, the tray lock mechanism and push mechanism can be both disposed in the operation side front portion.

Figure 8:
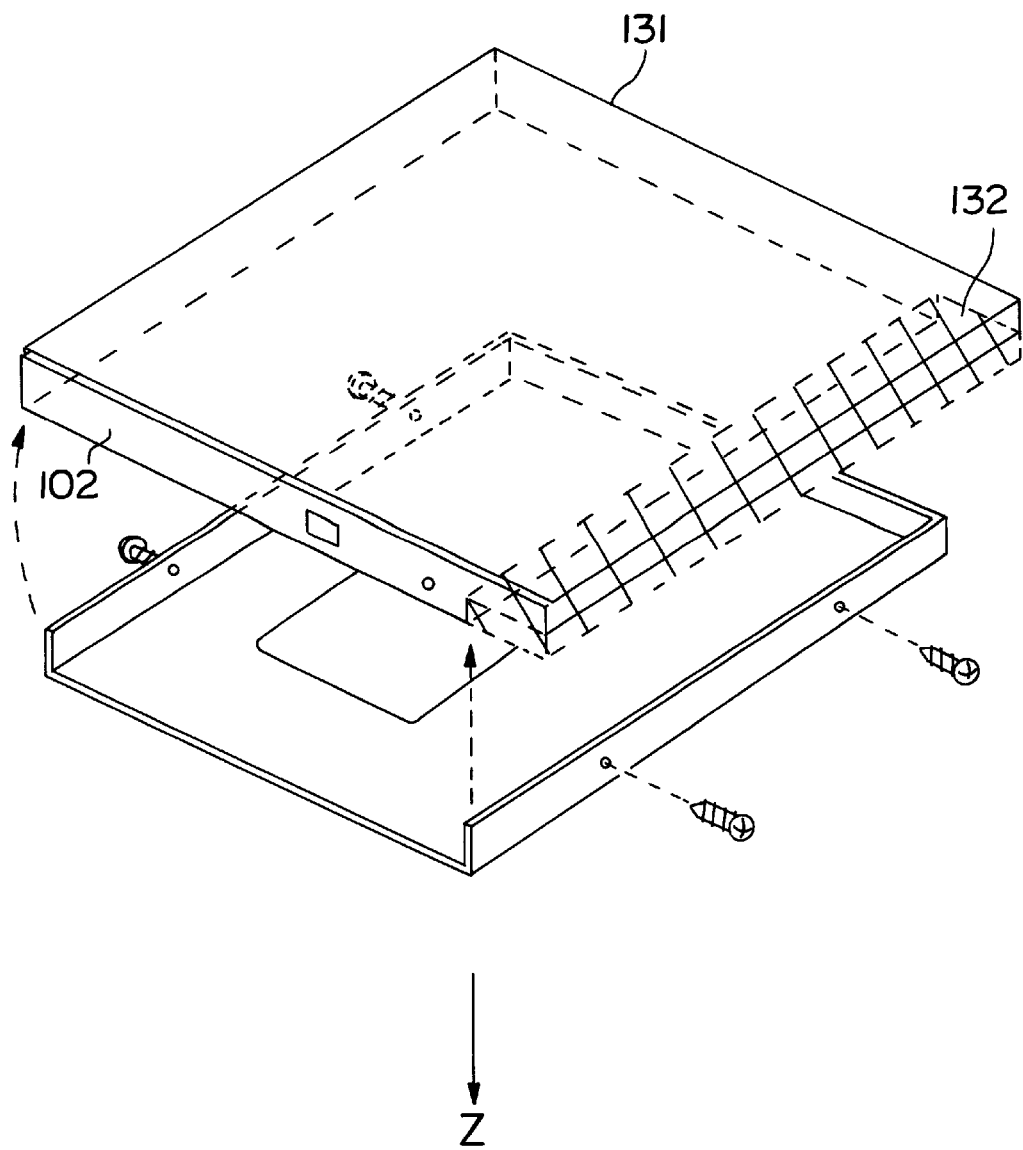
FIG. 8 is a perspective view for explaining outer case and mounting.
Figure 9:
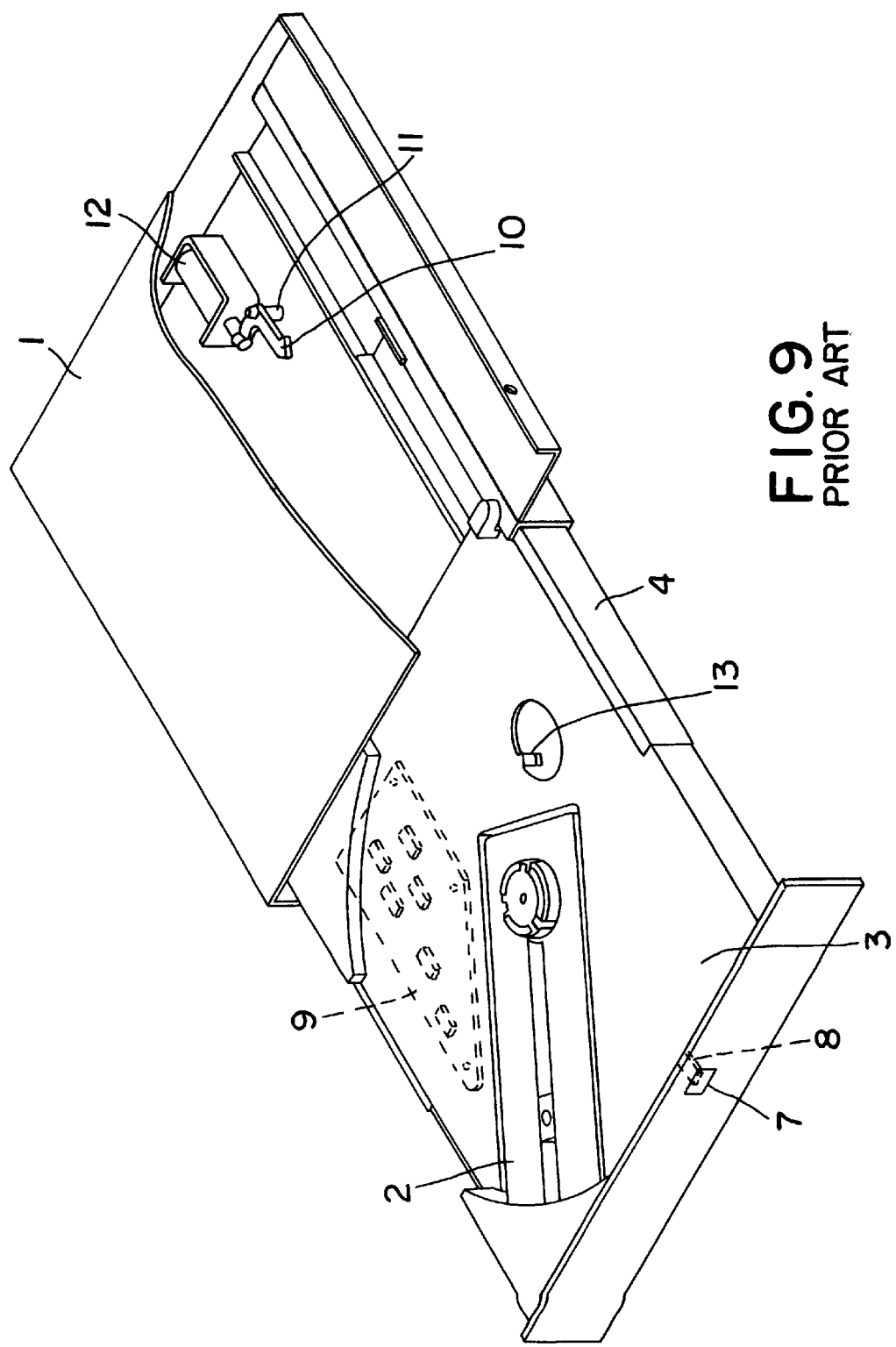
FIG. 9 is an internal structural drawing of a conventional disk apparatus.

Back to FIG. 1, an outer case 130 is composed of the main body chassis 100 forming the bottom and an upper cover 131 forming the top. The outer case 130 has a recess 132 formed at its right side. FIG. 8 is a perspective view showing the outer case and mounting. As shown in FIG. 8, the recess 132 is used as a flange for mounting on a computer.

Moreover, as shown in FIG. 5 through FIG. 7, the forced eject mechanical parts can be disposed in the internal space of the recess 132. In this way, the injecting, accommodating and locking mechanisms not necessary for rotating and driving the disk can be assembled in the internal space of the recess 132, so that the space in the peripheral parts and corner parts not used for the disk can be utilized effectively.

Further, when the disk apparatus is incorporated in a computer, as shown in the shaded area in FIG. 8, the available space at the computer side is increased, and the computer side parts mounting area is extended. In particular, as mentioned above, when the entire thickness of the tray lock mechanism is composed at 5 mm or less, the thickness of the recess 132 can be composed at 6 mm (¼ inch) or less.

INDUSTRIAL APPLICABILITY

As specifically described above, according to the invention, a recess 132 is formed at one side of the outer case 130, and this recess 132 is used as a mounting flange to the computer, and moreover the entire thickness of the tray lock mechanism is composed at 5 mm or less and is accommodated in the rear internal space of the recess 132, the entire push mechanism is put inside the rail 103, and the forced eject mechanical parts are arranged in the internal space of the recess 132, so that a disk apparatus reduced in the thickness in the height direction of the outer case is presented.

As a result, the entire thickness of the disk apparatus is composed at 12.7 mm (½) or less. Therefore, in the desktop type computer, two units can be installed in the mounting slot for one external memory device, and in the notebook type or pocket type computer, the disk apparatus can be installed. Moreover, a pocket portable type disk apparatus can be also presented.

What is claimed is:

1. A disk apparatus comprising
   a main body chassis for supporting said disk apparatus,
   a tray for mounting a disk thereon,
   movable support means for movably supporting said tray in order to accommodate and eject said tray within the disk apparatus,
   stopping means for stopping said tray in said main body chassis and further for engaging a lock arm for locking said tray so as to be locked and unlocked freely,
   actuator means having a field system means composed of a ferromagnetic element formed and magnetized in a flat plate, a coil wound and formed flatly and a cam, whereby said actuator means provides a rotating torque responsive to providing a current to said coil, and
   wherein said stopping means is engaged with said lock arm, and wherein said lock arm unlocks said tray responsive to said cam of said actuator means moving said lock arm.

2. A disk apparatus of claim 1, wherein said actuator means has a thickness of no more than 5 mm in the direction vertical to a surface of said disk.

3. A disk apparatus comprising
   a main body chassis for supporting said disk apparatus,
   a tray for mounting a disk thereon,
   movable support means for movably supporting said tray in order to accommodate and eject said tray within the disk apparatus,
   stopping means for stopping said tray in said main body chassis and further for engaging a lock arm for locking said tray so as to be locked and unlocked freely,
   actuator means having a field system means composed of a ferromagnetic element formed and magnetized in a flat plate, a coil wound and formed flatly and a cam, whereby said actuator means provides a rotating torque responsive to providing a current to said coil,
   unlocking means movably supported by said tray for manipulating said actuator means, and
   wherein said stopping means is engaged with said lock arm, and by operating said unlocking means, said actuator means is manipulated so that the cam causes said lock arm to disengage from said stopping means, thereby unlocking said tray.

4. A disk apparatus of claim 3, wherein said actuator means has a thickness of no more than 5 mm in the direction vertical to a surface of said disk.

5. A disk apparatus comprising
   a main body chassis for supporting said disk apparatus,
   a tray for mounting a disk thereon,
   movable support means for movably supporting said tray in order to accommodate and eject said tray within the disk apparatus,
   enclosure means accommodating said main body chassis, said tray and said movable support means, and having a projecting edge with a thickness of about half of a thickness of the enclosure means,
   stopping means for stopping said tray in said main body chassis and further for engaging a lock arm for locking said tray so as to be locked and unlocked freely,
   actuator means having a field system means composed of a ferromagnetic element formed and magnetized in a flat plate, a coil wound and formed flatly and a cam, whereby said actuator means provides a rotating torque responsive to providing a current to said coil, an unlocking means movably supported by said tray for manipulating said actuator means so that the cam causes said lock arm to disengage from said stopping means, thereby unlocking said tray.

6. A disk apparatus of claim 5, wherein said actuator means and said unlocking means are accommodated in said projecting edge.

7. A disk apparatus of claim 5, wherein said projecting edge has a thickness of no more than 6 mm in the direction vertical to a surface of said disk.

8. A disk apparatus comprising
   a main body chassis for supporting said disk apparatus,
   a tray for mounting a disk thereon,
   movable support means for movably supporting said tray in order to accommodate and eject said tray within the disk apparatus,
   enclosure means accommodating said main body chassis, said tray and said movable support means, and having a projecting edge with a thickness of about half of a thickness of the enclosure means,
   stopping means for stopping said tray in said main body chassis and further for engaging a lock arm for locking said tray so as to be locked and unlocked freely,
   actuator means having a field system means composed of a ferromagnetic element formed and magnetized in a flat plate, a coil wound and formed flatly and a cam, whereby said actuator means provides a rotating torque responsive to providing a current to said coil, and
   unlocking means movably supported by said tray for manipulating said actuator means, and when current is supplied to said coil or when said unlocking means is manipulated, said lock arm, responsive to movement of said cam of said actuator means, clears the engagement with said stopping means, thereby unlocking said tray.

9. A disk apparatus of claim 8, wherein said actuator means and said unlocking means are accommodated in said projecting edge.

10. A disk apparatus of claim 8, wherein said projecting edge has a thickness of no more than 6 mm in the direction vertical to a surface of said disk.

11. A disk apparatus comprising
a main body chassis for supporting said disk apparatus,
a tray for mounting a disk thereon,
movable support means for movably supporting said tray in order to accommodate and eject said tray within the disk apparatus,
eject thrusting means disposed inside of said movable support means in order to thrust said tray in an eject direction,
stopping means for stopping said tray in said main body chassis and further for engaging a lock arm for locking said tray so as to be locked and unlocked freely,
actuator means having a field system means composed of a ferromagnetic element formed and magnetized in a flat plate, a coil wound and formed flatly and a cam, whereby said actuator means provides a rotating torque responsive to providing a current to said coil, and
unlocking means movably supported by said try for manipulating said actuator means, wherein said tray is ejected by a specified extent when said cam moves said lock arm to disengage said lock arm from said stopping means.

12. A disk apparatus of claim 11, wherein said actuator means has a thickness of no more than 5 mm in the direction vertical to a surface of said disk.

13. A disk apparatus comprising
a main body chassis for supporting said disk apparatus,
a tray for mounting a disk thereon,
movable support means for movably supporting said tray in order to accommodate and eject said tray within the disk apparatus,
eject thrusting means disposed inside of said movable support means in order to thrust said tray in an eject direction,
stopping means for stopping said tray in said main body chassis and further for engaging a lock arm for locking said tray so as to be locked and unlocked freely,
actuator means having a field system means composed of a ferromagnetic element formed and magnetized in a flat plate, a coil wound and formed flatly and a cam, whereby said actuator means provides a rotating torque responsive to providing a current to said coil,
unlocking means movably supported by said tray for manipulating said actuator means, and
wherein said stopping means is engaged with said lock arm, and when current is supplied to said coil or when said unlocking means is manipulated, said cam moves said lock arm to disengage said lock arm from said stopping means to unlock said tray, and thereby said tray is ejected by a specified extent.

14. A disk apparatus of claim 13, wherein said actuator means has a thickness of no more than 5 mm in the direction vertical to a surface of said disk.

15. A disk apparatus comprising
a main body chassis for supporting said disk apparatus,
a tray for mounting a disk thereon,
movable support means for movably supporting said tray in order to accommodate and eject said tray within the disk apparatus,
eject thrusting means disposed inside of said movable support means in order to thrust said tray in an eject direction,
enclosure means accommodating said main body chassis, said tray and said movable support means, and having a projecting edge with a thickness of about half of a thickness of the enclosure means,
stopping means for stopping said tray in said main body chassis and further for engaging a lock arm for locking said tray so as to be locked and unlocked freely,
actuator means having a field system means composed of a ferromagnetic element formed and magnetized in a flat plate, a coil wound and formed flatly, and a cam, and unlocking means movably supported by said tray for manipulating said actuator means so that the cam causes said lock arm to disengage from said stopping means,
wherein said tray is ejected by a specified extent when said lock arm disengages from said stopping means.

16. A disk apparatus of claim 15, wherein said actuator means and said unlocking means are accommodated in said projecting edge.

17. A disk apparatus of claim 15, wherein said enclosure means has a thickness of no more than 12.7 mm in the direction vertical to a surface of said disk, and said projecting edge has a thickness of no more than 6 mm in the direction vertical to the surface of said disk.

18. A disk apparatus comprising
a main body chassis for supporting said disk apparatus,
a tray for mounting a disk thereon,
movable support means for movably supporting said tray in order to accommodate and eject said tray within the disk apparatus,
eject thrusting means disposed inside of said movable support means in order to thrust said tray in an eject direction,
enclosure means accommodating said main body chassis, said tray and said movable support means, and having a projecting edge with a thickness of about half of a thickness of the enclosure means,
stopping means for stopping said tray in said main body chassis and further for engaging a lock arm for locking said tray so as to be locked and unlocked freely,
actuator means having a field system means composed of a ferromagnetic element formed and magnetized in a flat plate, a coil wound and formed flatly and a cam, and unlocking means movably supported by said tray for manipulating said actuator means,
wherein said stopping means is engaged with said lock arm, and when current is supplied to said coil or when said unlocking means is manipulated, said cam causes said lock arm to disengage from said stopping means to unlock said tray, and thereby said tray is ejected by a specified extent.

19. A disk apparatus of claim 18, wherein said actuator means and said unlocking means are accommodated in said projecting edge.

20. A disk apparatus of claim 18, wherein said enclosure means has a thickness of no more than 12.7 mm in the direction vertical to a surface of said disk, and said projecting edge has a thickness of no more than 6 mm in the direction vertical to the surface of said disk.

* * * * *